United States Patent

[11] 3,593,726

[72] Inventors Barton Lockhart
905 Red Oak Lane, Corsicana, Tex.;
Travis C. Harris, deceased, late of
Ardmore, Okla. (by Edward Harris,
administrator)
[21] Appl. No. 807,133
[22] Filed Mar. 13, 1969
[45] Patented July 20, 1971
[73] Assignee said Lockhart, by said Harris

[54] TIRE SPRAYING APPARATUS
11 Claims, 3 Drawing Figs.
[52] U.S. Cl. ................................................. 134/45,
134/172, 239/551
[51] Int. Cl. ..................................................... B60s 3/04
[50] Field of Search .......................................... 239/547,
551; 134/45, 123, 172

[56] References Cited
UNITED STATES PATENTS
3,419,022 12/1968 Youngren, Sr. et al. ....... 134/45
3,446,217 5/1969 Collier .......................... 134/45
FOREIGN PATENTS
1,275,393 8/1968 Germany ..................... 134/45

Primary Examiner—Robert L. Bleutge
Attorney—Beveridge & De Grandi

ABSTRACT: Chemical cleaning solutions are sprayed on the sidewalls of a vehicle tire by spray nozzles which are spaced longitudinally along both sides of the vehicle's path. Looped resilient conduits in the track of the tires form a portion of a flow path leading from a source of cleaning solution to the nozzles, and check valves are appropriately placed so that compression of the resilient conduits by a tire wall discharge the solution from the nozzles onto the tire sidewalls.

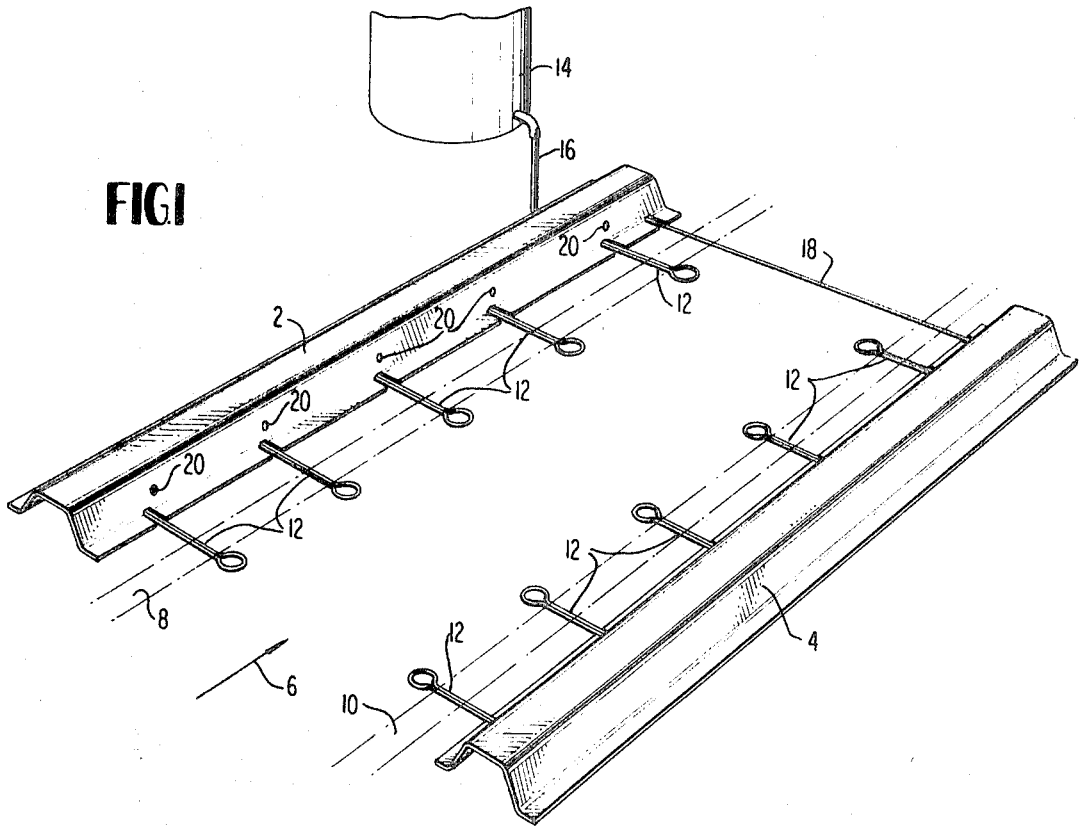
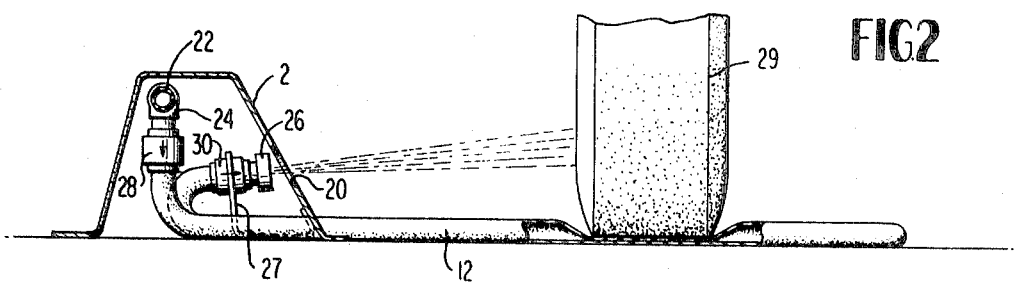
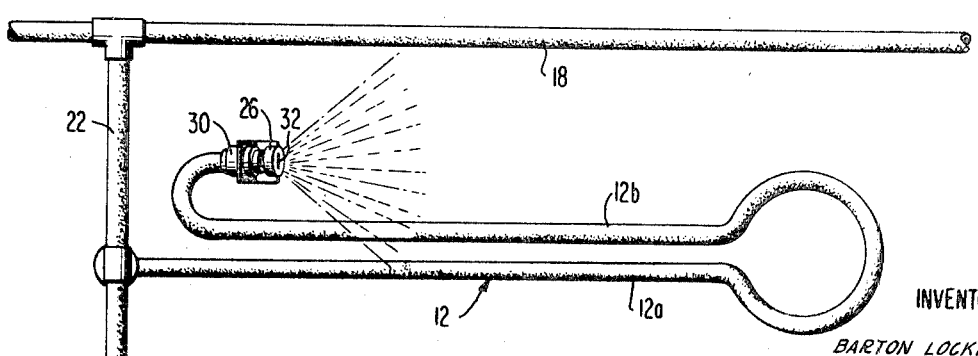

3,593,726

TIRE SPRAYING APPARATUS

BACKGROUND

This invention involves apparatus for spraying liquids on the sidewalls of vehicle tires, and is particularly suited for spraying chemical cleaning solutions or solvents on white sidewall tires of vehicles at carwash facilities. The invention utilizes the movement and weight of the vehicle itself to compress an element filled with the solution so that the solution is discharged through a spray nozzle onto the sidewall of the tire. Preferably, a series of such compressible elements and nozzles are arranged longitudinally alongside the track of the tire so that each nozzle will direct a spray on at least a portion of an exposed area of the sidewall.

In the past, the weight and movement of vehicles has been used to perform various tasks such as pumping water to an elevated position or spraying the rails of a railroad track. However, this principle has neither been used for the purpose of spraying cleaning solutions on tire sidewalls nor has it been used in apparatus wherein a nozzle is oriented so that a spray will be directed at an elevation approximating that of a tire sidewall. Nothing of this nature has, to our knowledge, been utilized in conjunction with carwash facilities or for applying cleaning solutions to the sidewalls of a vehicle tire.

SUMMARY

According to the invention, apparatus for spraying liquid on a tire sidewall includes nozzles oriented to direct the spray toward the sidewall, a supply source of cleaning solution, and a normally expanded compressible element in the flow path between the supply source and the nozzle. The compressible element is located where it will be compressed by a vehicle tire moving on an anticipated track. Appropriately located check valves on opposite sides of the compressible element will permit flow only toward the nozzle when the internal volume of the compressible element is reduced as a vehicle passes thereover. Preferably, a plurality of nozzles and compressible elements are located alongside the track of a tire so that each nozzle will direct a spray upon a portion of the sidewall which is exposed at that location.

This invention provides a simple and relatively maintenance free apparatus for applying solution to the sidewalls of vehicle tires in order to avoid the necessity of applying cleaning solutions with a hand-manipulated nozzle. The invention also avoids the difficulties encountered in applying cleaning solutions to sidewall portions concealed by the vehicle's fender or fender skirt. This is because plural nozzles dispense cleaning solution at spaced intervals during the normal movement of the tire, so that a different portion of the sidewall will be exposed at each nozzle location.

Among the many objects of the invention, it is a principal object to provide simple, convenient, and inexpensive apparatus which is capable of spraying liquid on the sidewall of a ground-traversing vehicle tire. The satisfaction of other objects will be appreciated from an inspection of the following description, which relates to only one of many suitable embodiments of the invention.

THE DRAWINGS

FIG. 1 is a perspective view showing an installation wherein a plurality of compressible elements and nozzles are spaced longitudinally on opposite sides of the path of a vehicle;

FIG. 2 shows a portion of the apparatus in operation, with a vehicle tire passing over a compressible element to force liquid from a spray nozzle onto the tire sidewall;

FIG. 3 is a plan view of a single compressible element and nozzle assembly, with the support channel removed for purpose of illustration.

DESCRIPTION OF A PREFERRED EMBODIMENT

The apparatus shown in FIG. 1 may be located at the entry passage to an automatic carwash facility or at any other location where a car is advanced to a cleaning station, either under its own power or under the power of a towing device.

The apparatus preferably includes a pair of elongated channels 2 and 4 which are located on opposite sides of the path of a vehicle advancing in the direction indicated by arrow 6. The channels 2 and 4 each have a series of spaced-apart apertures 20 through which the spray of cleaning solution is emitted by the nozzles 26 shown in FIGS. 2 and 3. The tires of the vehicle will follow tracks indicated in broken lines at 8 and 10 to serially compress looped sections 12 of resilient hose lying thereacross. The hose may be made of vinyl or other materials which are normally expanded but will compress when subjected to the weight of a vehicle tire. A satisfactory hose may be made of materials resistant to extreme variations in ambient temperature, and may have an outside diameter of five-eighths inch and an inside diameter of three-eighths inch.

The source of the cleaning solution is a tank 14. A discharge conduit 16 leads from tank 14 to a header within the channel 2 and to a crossover conduit 18 which connects to a header in channel 4.

The arrangement of an individual compressible hose element and its respective nozzle is shown in FIGS. 2 and 3. The cleaning solution from the tank 14 is distributed along the length of the channel 2 by the header 22 which has a suitable Tee or elbow fitting 24 leading to each compressible hose section 12. The opposite end of each of the hose sections 12 is connected to a spray nozzle 26 which is aligned with the opening 20 and oriented to direct the spray onto the vehicle tire sidewall. As shown in FIG. 2, each nozzle is attached to its respective support channel by a bendable metallic bracket 27.

When a tire rides over the compressible hose section 12, the internal volume of the hose section is reduced, thereby expelling a portion of its liquid content. The discharge of liquid in a direction toward the supply tank 14 is prevented by a check valve 28 located at the inlet end of the resilient conduit 12. This check valve is preferably a ball check valve formed of materials which resist the corrosive and clogging action of the cleaning solution. This valve permits flow only in a direction toward the nozzle. Therefore, compression of the resilient hose section 12 will force liquid toward the nozzle so that a spray will be discharged against the sidewall of tire 29.

As the vehicle moves forwardly, the resilient hose section 12 will return to its original expanded state, thus drawing in additional cleaning solution from the supply header 22. In order to prevent air from being drawn inwardly through the nozzle, at this stage, a second check valve 30 is provided at the nozzle and oriented to permit flow only in a direction toward the nozzle. A spring-loaded countercurrent diaphragm check valve has been satisfactorily used for this purpose.

The nozzle itself may take various forms, but preferably includes a plate with slot 32 therein, since this type of nozzle provides the preferred spray pattern and is capable of operating satisfactorily at the relatively low flow rate created by the compression of the resilient hose section 12. The slot is formed to create an 80° fan spray in horizontal planes, and the vertical extent of the spray is around 2 or 3 inches where it strikes the sidewall.

The spacing between the nozzles is governed by the spray pattern striking the tire sidewall. The liquid discharged by two adjacent nozzles on a tire sidewall preferably will overlap slightly.

This requires that the horizontal dimension of the spray reaching the tire track is greater than the longitudinal spacing between adjacent nozzles.

When using the 80° fan-producing nozzles described above, an 8 foot spacing between the channels 2 and 4 requires a 17½-inch spacing between adjacent nozzles.

The elevation angles of the nozzles must be adjusted on location to ensure that the spray will strike the proper portion of the tire sidewalls, preferably centered about 4 to 5 inches above the ground. This adjustment is conveniently made simply by bending the steel support bracket 27 which is attached to the respective channel member 2 or 4.

Referring to FIG. 3, it will be noted that the looped resilient hose section 12 is oriented so that the first leg $12_a$ which is compressed by a vehicle passing thereover is the leg closer to the liquid supply source, and the second leg $12_b$ is the section closer to the nozzle. This orientation ensures that compression of one leg of the loop will not have a valving action which prevents the proper discharge of liquid toward the nozzle upon compression of the second leg.

The installation of this apparatus at a carwash facility is relatively simple. The nozzle-carrying channels 2 and 4 are placed at a proper distance on opposite sides of the paths of incoming vehicles. The various conduits are connected and the loops 12 are placed in the anticipated tracks of the vehicle tires. Vehicles are then driven or otherwise moved between the channels while the elevation angles of the nozzles are suitably adjusted by bending the brackets 27.

As indicated previously, this disclosure involves only a presently preferred embodiment of the invention. Many variation and modifications may be made without departing from the spirit of the invention. For example, the fluid-distributing header 22 may be located between the tire tracks 8 and 10, with only single legs of the resilient hose extending outwardly therefrom to nozzles located on opposite sides of the vehicle path. Various expansible chamber devices other than the disclosed hose may constitute the compressible element. The number and arrangement of the nozzles may be varied. Accordingly, the invention is not limited to the sole illustrated embodiment but lies within the bounds described in the following claims.

It is claimed:

1. Apparatus for spraying liquid on the tire sidewalls of a vehicle moving along a given path where its tires will follow a track comprising, a liquid supply source, spray nozzle means oriented to direct a spray toward said path at the elevation of a tire sidewall, conduit means providing a flow line leading from the supply source to the nozzle, said conduit means including a normally expanded compressible element lying in said track, and check valve means in the flow line on opposite sides of the compressible element, said check valve means being constructed and oriented to permit flow of liquid through the flow line in a direction toward the nozzle.

2. Apparatus according to claim 1 wherein the compressible element is an elongated tubular conduit having resilient walls.

3. Apparatus according to claim 2 wherein the elongated tubular conduit extends at least two times across the track.

4. Apparatus according to claim 3 wherein the tubular conduit has first and second legs extending across the track, with the second leg being displaced beyond the first leg both in the flow line and along the track.

5. Apparatus according to claim 2 having a plurality of the spray nozzles spaced longitudinally alongside the path, and having an individual elongated tubular conduit and check valve means for each spray nozzle.

6. Apparatus according to claim 1 having a plurality of said nozzles spaced apart longitudinally along both sides of said path, and a said compressible element and a pair of said check valve means associated with each said nozzle.

7. Apparatus according to claim 6 wherein the nozzles on one side of the path and constructed and located to create a spray pattern having a given dimension extending longitudinally at the track, and the distance between adjacent nozzles is less than said given dimension.

8. Apparatus according to claim 6 having a pair of nozzle support means located on opposite sides of said path, each of said nozzles being attached to the support means on its respective side of said path.

9. Apparatus according to claim 8 wherein each of the compressible elements is an elongated tubular conduit having resilient walls and forming a loop extending across the tracks of the tires from the respective support means.

10. Apparatus according to claim 9 wherein the tubular conduit has at least two mutually adjacent portions in the track.

11. Apparatus according to claim 10 wherein the loop has a first leg and a second leg, with the second leg displaced beyond the first leg both in the flow line and along the track.